2,945,019
ETHYLENE POLYMERIZATION

Walter R. Wszolek, Ellicott City, Md., assignor to W. R. Grace & Co., Clarksville, Md., a corporation of Connecticut No Drawing. Filed June 9, 1959, Ser. No. 819,019

8 Claims. (Cl. 260—94.9)

Summarily, this invention embodies a novel method of synthesizing ethylene solid polymers by subjecting ethylene to the actions of a catalyst comprising a titanium carbide and preferably in addition, comprising an aluminum tri(lower) alkyl.

The use of aluminum trialkyl, per se, as a catalyst to polymerize ethylene is old in the art: See U.S. 2,699,457 issued to K. Ziegler et al. The polymer product obtained therein ranges from butylene to wax-range polymers.

However, I have now found that the use of an aluminum tri(lower) alkyl in combination with titanium carbide as a catalyst for ethylene polymerization results in a solid polyethylene product having a melting point above 110° C., a density in the range of about 0.92 to 0.96, and a molecular weight in excess of 1000 weight average.

There are several and various methods of preparing a titanium carbide suitable for use in this invention that are well known in the art. For example: titanium carbides are prepared by heating powdered titanium in the presence of carbon at about 2000° C. Another method of preparation is the heating of titanium filaments in the presence of carbon. Still another method is compacting powdered titanium and carbon at elevated temperatures. The above methods are carried out in an inert gaseous atmosphere e.g. argon or the other noble gases. Yet another method of preparing TiC is by heating $TiO_2$ with carbon to a temperature of about 2000° C. in a reducing atmosphere i.e. hydrogen. Titanium carbides prepared by the above known processes are in general interstitial compounds in which the Ti/C ratio is rarely a simple fraction. For such carbides, the formula $TiC_x$ is conveniently given. The above procedures give $TiC_x$ where $x$ has a value between 0.5 and 1 inclusive. Such $TiC_x$ is suitable for use in this invention. When the term "titanium carbide" is used herein, such $TiC_x$ is meant.

The titanium carbides formed by any of the various methods known in the art including the aforesaid, can be subjected to additional treatment if desired to increase their catalyst activity. Such treatment may include a grinding or abrading step in an argon or other inert atmosphere to insure fresh active catalyst surfaces. A suitable method for maintaining the $TiC_x$ catalyst free of contaminants during handling and transfer to the polymerization reactor, is by means of a "dry box," wherein a slight pressure of argon or other inert noble gas is maintained.

Although the titanium carbides are operable per se as polymerization catalysts for ethylene, the use of an aluminum tri(lower)alkyl conjointly therewith is preferable for increased catalytic activity as determined by the well known formula: grams polymer/grams catalyst x reaction time=catalyst activity.

The following examples will aid in understanding the invention but will in no way limit its scope.

Example I 4.43 grams of dry powdered TiC was charged under a dry nitrogen atmosphere to a mechanically stirred 1-liter autoclave equipped with gas inlet and outlet and containing 0.66 pound of dry cyclohexane. Agitation was commenced and the slurry heated to about 134° C. The autoclave was pressured with ethylene to 490 p.s.i.g., and the reaction proceeded for 3 hours at temperatures between 133 and 135° C. A crude product of solid polyethylene (1 gram) was obtained.

Example II

Using the equipment of Example I, 5.43 grams of powdered TiC dried at 500° C. was charged under nitrogen to the autoclave containing 0.66 pound of cyclohexane. To this was added 0.013 mole of triisobutyl aluminum. The autoclave was heated to 91° C. and pressured to 450 p.s.i.g. with ethylene. After one hour, during which time the pressure ranged between 350 and 460 p.s.i.g., the run was discontinued. After cooling, and venting, the yield of crude solid polymer was 1 gram.

Although the aluminum trialkyl used in the examples was triisobutyl aluminum, the aluminum tri(lower)alkyls in general are operative with titanium carbide to catalyze the polymerization of ethylene. Such other aluminum trialkyls include trimethyl, triethyl, tripropyl, triisopropyl, tributyl, triamyl, triisoamyl, trihexyl, triisohexyl, triheptyl, and trioctyl aluminum.

The ratio of aluminum trialkyl to titanium carbide is not critical. The use of relatively small amounts of aluminum trialkyl will cause some increase in catalytic activity. Mole ratio of aluminum trialkyl:titanium carbide of 0.1 to 10:1 respectively are operative; a preferred range is 1 to 5:1.

The amount of catalyst that can be used to effect a polymerization can vary considerably. Relatively small amounts of titanium carbide are operable in forming relatively large amounts of polymer. In general, a suitable range of 0.001–10 grams of titanium carbide per gram of polymer produced. Even larger amounts of catalyst are operable but occasionally present a purification problem.

In practicing this invention, it has been found that pressures of at least 100 p.s.i. are desirable to cause the reaction to proceed. Preferably, however, a pressure of 400–1000 p.s.i. or higher is maintained.

Although the reaction can be performed at relatively high pressures e.g. 5000 p.s.i. and higher, the additional expense of equipment required to withstand such pressures, in general outweighs the increased polymer yield and/or shorter reaction time.

A reaction temperature in the range of 50–300° C., is operable, preferably 75–200° C. is adequate and for practice purposes, a reaction temperature in the range of 75–150° C. is preferred.

As a reaction menstruum, substantially any inert material can be used which is liquid under the conditions of temperature and pressure employed and which has a solvent action on ethylene. These solvents are well known in the art. Inert liquid hydrocarbon solvents are preferred and are preferably substantially free of materials that react with or deactivate the catalyst, e.g. water, $CO_2$, $O_2$, acetylene $NH_3$, and ethers, and similarly reactive compounds. Suitable inert liquid hydrocarbon solvents include pentane, hexane, heptane, cyclohexane, octane, benzene, xylene, toluene and the like.

Uses of the products of this invention are many and varied. Polyethylene produced by this invention has the same uses as that produced by the prior art including film filament, pipe, molded and extruded articles, e.g. tubes, bottles, and containers.

I claim:

1. The process of forming normally solid polymers of ethylene which comprises subjecting ethylene in an inert liquid hydrocarbon solvent at a pressure in the range 100–1000 p.s.i. and a temperature in the range 50–300°

C. to the action of a catalyst consisting essentially of titanium carbide.

2. The process according to claim 1 wherein the inert liquid hydrocarbon solvent is cyclohexane.

3. The process according to claim 1 wherein the catalyst also contains an aluminum trialkyl in which the alkyl groups contain 1 to 8 carbon atoms.

4. The process according to claim 3 wherein the aluminum (tri)alkyl is aluminum triisobutyl.

5. The process of forming a normally solid polymer of ethylene that comprises subjecting ethylene under a pressure of 400–500 p.s.i. and a temperature of 50–150° C. in a cyclohexane solvent to the action of a catalyst consisting essentially of titanium carbide.

6. The process according to claim 5 wherein the pressure is in the range 350–500 p.s.i., the temperature is 75–150° C. and the catalyst also contains an aluminum trialkyl in which the alkyl groups contain 1 to 8 carbon atoms.

7. The process according to claim 5 wherein the catalyst also contains an aluminum trialkyl in which the alkyl groups contain 1 to 8 carbon atoms.

8. The process according to claim 7 wherein the aluminum trialkyl is aluminum triisobutyl.

References Cited in the file of this patent

UNITED STATES PATENTS

| | | |
|---|---|---|
| 1,930,716 | Jaeger | Oct. 17, 1933 |
| 2,827,447 | Nowlin et al. | Mar. 18, 1958 |
| 2,890,212 | Murray | June 9, 1959 |